United States Patent
Acosta

(10) Patent No.: US 6,886,678 B2
(45) Date of Patent: May 3, 2005

(54) CLUTCH ASSEMBLY FOR ELECTRIC MOTORS TO PREVENT BACK DRIVE

(75) Inventor: Luis E. Acosta, Lawrenceville, GA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 1 day.

(21) Appl. No.: 10/461,640

(22) Filed: Jun. 13, 2003

(65) Prior Publication Data

US 2004/0216981 A1 Nov. 4, 2004

Related U.S. Application Data

(60) Provisional application No. 60/467,818, filed on May 2, 2003.

(51) Int. Cl.[7] .......................... F16D 55/14; F16H 57/00
(52) U.S. Cl. ................... 192/223.3; 74/411.5; 74/425; 188/82.9; 188/134; 192/223.2
(58) Field of Search .............................. 192/223.3, 223, 192/223.2; 188/82.9, 134; 74/425, 411.5; 49/349

(56) References Cited

U.S. PATENT DOCUMENTS

| 150,041 | A | | 4/1874 | Hubbard |
|---|---|---|---|---|
| 1,147,126 | A | | 7/1915 | Smith |
| 2,009,964 | A | | 7/1935 | Mottlau |
| 2,766,851 | A | * | 10/1956 | Driehaus .................... 188/82.8 |
| 2,783,861 | A | * | 3/1957 | Jungles ..................... 192/223.3 |
| 2,925,157 | A | * | 2/1960 | Davis ....................... 192/223.3 |
| 3,108,670 | A | | 10/1963 | Habicht |
| 3,285,377 | A | * | 11/1966 | Rasmussen ............... 192/223.3 |
| 3,895,701 | A | | 7/1975 | Albertson et al. |
| 4,346,793 | A | * | 8/1982 | Fuse et al. .................. 188/134 |
| 4,770,279 | A | | 9/1988 | Shiozaki et al. |
| 4,949,824 | A | | 8/1990 | Buckley et al. |
| 5,035,309 | A | | 7/1991 | Takada |
| 5,299,676 | A | * | 4/1994 | Wade ....................... 192/223.3 |
| 5,433,305 | A | | 7/1995 | Takamatsu et al. |
| 5,700,196 | A | | 12/1997 | Banemann et al. ........... 464/36 |
| 5,941,355 | A | | 8/1999 | Iga |
| 6,073,741 | A | | 6/2000 | Liu |
| 6,229,233 | B1 | | 5/2001 | Torii et al. |
| 6,382,384 | B2 | | 5/2002 | Torii et al. |
| 2002/0050430 | A1 | | 5/2002 | Liau |

FOREIGN PATENT DOCUMENTS

| DE | 29510741 | 12/1995 |
|---|---|---|
| DE | 29715147 | 11/1997 |
| DE | 10327736 | 1/2004 |
| GB | 209385 | 7/1924 |
| JP | 200230583 | 8/2000 |

OTHER PUBLICATIONS

PCT International Search Report and Written Opinion, Mailed Jul. 22, 2004.

* cited by examiner

Primary Examiner—Rodney H. Bonck

(57) ABSTRACT

A clutch assembly 10 is provided for a motor having a shaft 36, a worm 40 associated with the shaft and an output gear 42 engaged by the worm. The clutch assembly includes a clutch body 12 having a plurality of pockets 22 in a surface thereof. Each pocket has a cam surface 24 defined by a depth of the pocket that gradually increases from a deep end to a shallow end. A ball bearing 18 is disposed in each of the pockets 22. Spring structure 16 maintains the ball bearings in the pockets. A pressure plate 14 is operatively associated with the clutch body and is constructed and arranged to be coupled with the shaft 36 of the motor. Under certain conditions, the ball bearings wedge between the pressure plate and surfaces defining the associated pocket, thereby preventing rotation of the shaft when coupled with the pressure.

17 Claims, 4 Drawing Sheets

SHAFT AXIAL DIRECTION

SHAFT CW ROTATION VIEWED FROM THIS END

OUTPUT GEAR DRIVEN IN CW ROTATION AS VIEWED FROM PAGE SURFACE SHAFT IS THE DRIVING ELEMENT

PRESSURE PLATE FORCE

PRESSURE PLATE ROTATION

CLUTCH ASSEMBLY FOR ELECTRIC MOTORS TO PREVENT BACK DRIVE

This application is based on U.S. Provisional Application No. 60/467,818, filed on May 2, 2003, and claims the benefit thereof for priority purposes.

FIELD OF THE INVENTION

The invention relates to a unidirectional clutch assembly for electric motors that becomes operational (engages) in one axial and angular shaft directions so that the assembly can discriminate between normal motor operation and a back drive condition.

BACKGROUND OF THE INVENTION

The purpose of this assembly is to prevent a worm and gear from being back driven in the event that a torque is applied at the output end of a gear arrangement.

Currently, this function is achieved by decreasing the gearing efficiency; the negative resultant effect is that the overall system efficiency is decreased as well, possibly requiring a larger motor. By selectively having the ability to lock the system drivetrain, the efficiency of the worm and gear arrangement can be optimized to a higher level minimizing concerns of back drive.

Current systems with similar functionality are based on the overrunning clutch drive configuration with an added taper to the shaft, so axial engagement is accomplished when shaft motion has both specific axial and angular directions.

These designs are comprised of numerous small components that can increase costs.

Thus, there is a need to provide a clutch assembly having fewer parts than conventional assemblies and one that does not require modifications to an existing shaft.

SUMMARY OF THE INVENTION

An object of the present invention is to fulfill the need referred to above. In accordance with the principles of the present invention, this objective is obtained by a providing a clutch assembly for a motor having a shaft, a worm associated with the shaft and an output gear engaged by the worm. The clutch assembly includes a clutch body having a plurality of pockets in a surface thereof, each pocket having a cam surface defined by a depth of the pocket that gradually increases from a deep end to a shallow end. A ball bearing is disposed in each of the pockets. Spring structure is constructed and arranged to maintain the ball bearings in the pockets and to provide a preload between the clutch body and a pressure plate. The pressure plate is operatively associated with the clutch body and is constructed and arranged to be coupled with the shaft of the motor. The clutch assembly is constructed and arranged such that when the output gear of the motor is driven in a certain direction by an external torque causing an axial force to be exerted on the worm and thus inducing an axial movement and angular movement to the shaft, the plate member of the pressure plate comes into contact with the ball bearings transferring the axial and angular movements to the ball bearings which in turn move up the cam surface towards the shallow end of each pocket until the ball bearings wedge against the pressure plate and surfaces defining their respective pockets, thereby preventing rotation of the shaft when coupled with the pressure plate.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
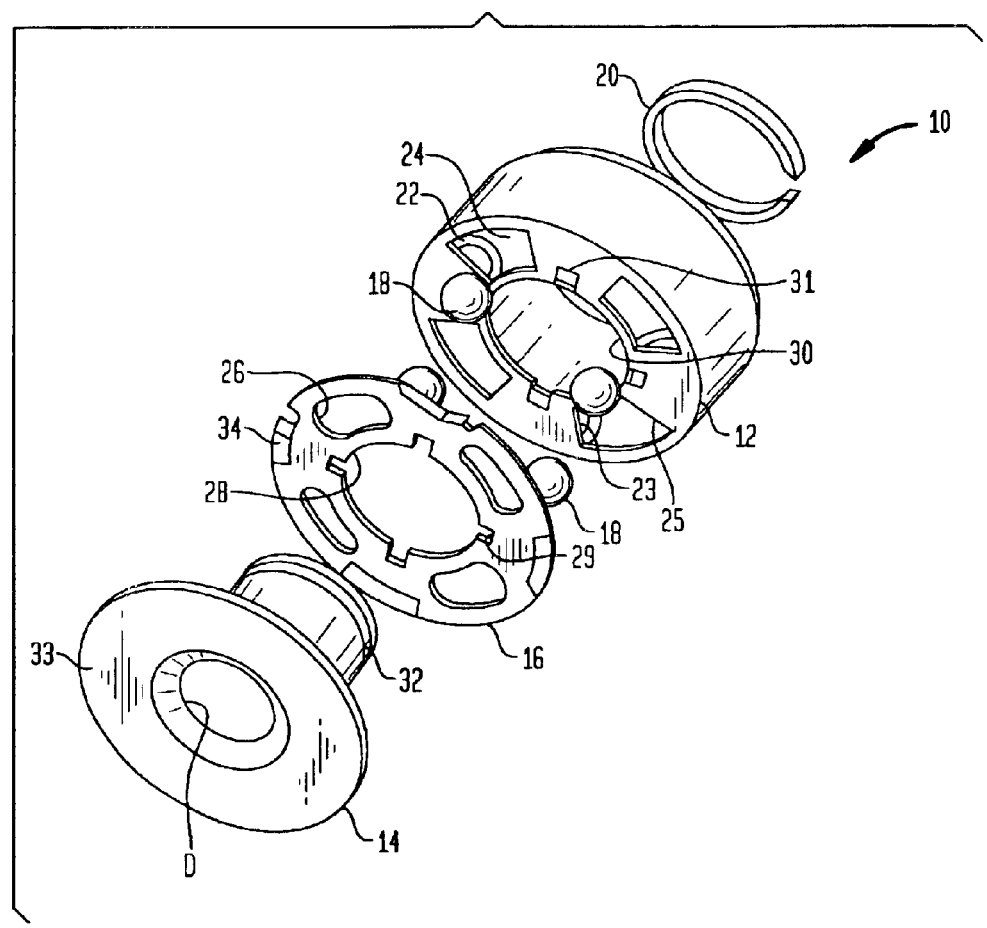
FIG. 1 is an exploded view of a clutch assembly for a worm and gear arrangement provided in accordance with the principles of the invention.

A clutch assembly is shown, generally indicated at 10, in FIG. 1 in accordance with the principles of the present invention. The clutch assembly 10 includes a clutch body 12, a pressure plate 14, a spring plate 16 between the clutch body 12 and the pressure plate 14, four ball bearings 18, and a retainer 20. The four ball bearings 18 are assembled one each inside an associated pocket 22 defined in the clutch body 12. The inside geometry of each pocket 22 is such that one end 23 of the pocket 22 is deeper than the opposing end 25, defining an incline or cam surface 24 which provides lift for the ball bearing 18 as it displaces from one end of the pocket 22 to the other end. The ball bearing displacement is accomplished by the pressure plate 14 coming into contact with the ball bearings 18, producing an angular displacement and a downward force on the bearings 18. The clutch body is configured such that the ball bearings are contained within it (they do not come in contact with the shaft), so a specific holder for the ball bearings is not needed.

The ball bearings 18 are held in place by the spring plate 16 which is staked onto or otherwise fastened to the clutch body 12. The spring plate 16 has an elongated opening 26 therein associated with each ball bearing 18 so that at least a portion of each ball bearing extends through an associated opening 26 when the ball bearing is disposed in the pocket 22 (see FIG. 4). The spring plate 16 holds the ball bearings 18 in their respective pockets 22. If the ball bearings 18 lift upward due to their displacement, the spring plate 16 will push them down towards the deeper end of the pocket 22. An alternative configuration (not shown) includes tabs placed inside each of the four openings 26 in the spring plate 16, so each tab will exert a force on a ball bearing 18 and keep it preloaded (no looseness or rattle). The spring plate 16 includes a bore 28 there through that cooperates with a bore 30 of the clutch body 12 when assembled for receiving cylindrical portion 32 of the pressure plate 14. The spring plate 16 also includes keyways 29 around the bore 28 that mate with associated matching keys 31 around the bore 30 of the clutch body 12 to provide radial alignment between the elongated openings 26 in the spring plate and the associated pockets 22 in the clutch body 12.

Figure 4:
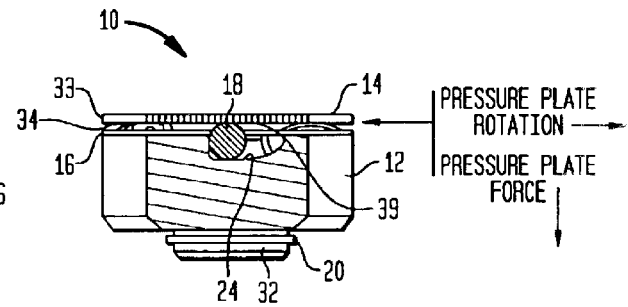
FIG. 4 is an enlarged sectional view of the clutch assembly in the position shown in FIG. 2.

As shown in FIGS. 1 and 4, the pressure plate 14 includes a cylindrical plate member or flange 33 and portion 32 extending therefrom. The plate member 33 has a diameter greater than that of the portion 32. The end of portion 32 of the pressure plate 14 extends beyond an extent of the clutch body 12 and the retainer 20, in the form of a retaining ring, secures the pressure plate 14 with respect to the clutch body 12. The plate member 33 defines a contact surface 39.

The spring plate 16 also includes spring members 34 near the periphery thereof that serve to preload the pressure plate 14 once assembled, thus decreasing noise during operation. The portion 32 of the pressure plate 14 is inserted into the bores 8 and 9 and held in place by the retainer 20, serving the function of a bearing.

Figure 2:
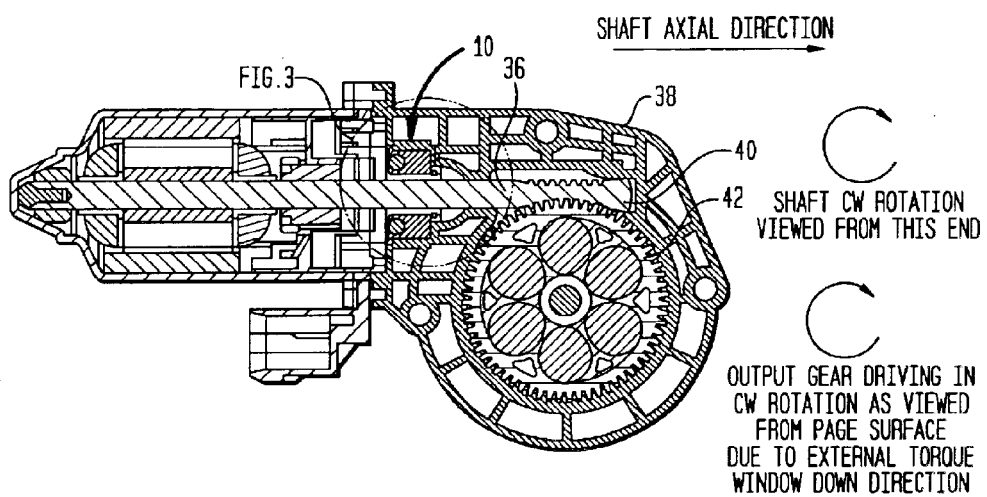
FIG. 2 is a sectional view of a motor having the clutch assembly of the invention with the motor output gear driven by external torque in a back drive condition (motor not energized).
Figure 3:
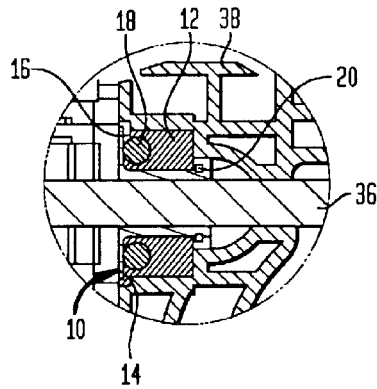
FIG. 3 is an enlarged view of the portion encircled at 3 in FIG. 2.

As shown, in FIGS. 2 and 3, a motor drive shaft 36 is inserted through the inside diameter D (FIG. 1) of the pressure plate 14 and through portion 32 and is in preferably a press fit arrangement therewith. The clutch body 12 is preferably press fit into the housing bore of the device (e.g., motor 38) in which the clutch assembly 10 is being used. In the illustrated embodiment, the motor is a windowlift motor for a vehicle and the shaft 36 includes or is coupled with a worm 40 that meshes with an output gear 42.

Figure 8:
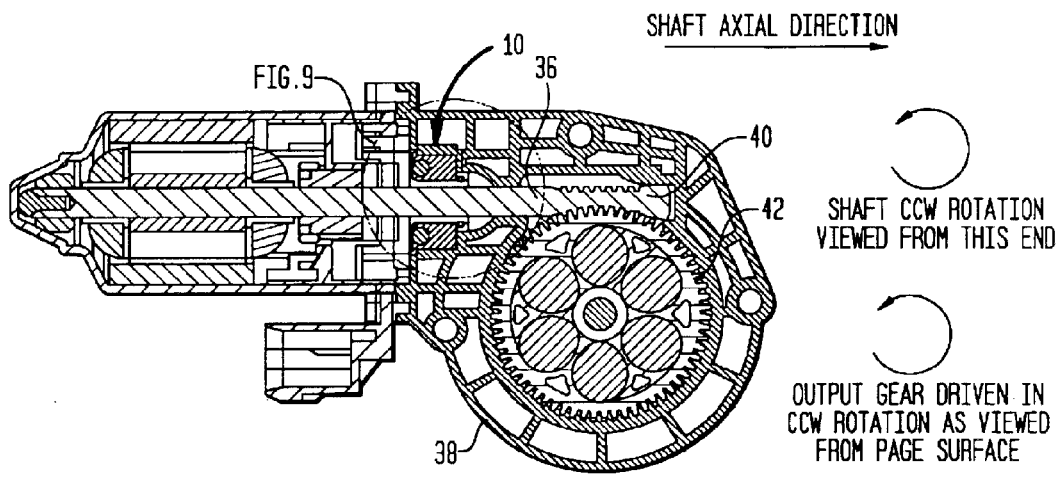
FIG. 8 is a sectional view of a motor having the clutch assembly of the invention with the motor shaft driving in a counter-clockwise direction (motor energized).

The operation of the clutch assembly 10 will be appreciated with reference to FIGS. 2–4. When the output gear 42 is "driven" in a reverse direction by an external torque (FIG. 2), the drive shaft 36 that is directly coupled to the gear 42 via the worm 40 will exert a specific axial force and angular displacements onto the clutch assembly. This specific set of displacements can be caused by someone pushing the vehicle window down (back drive condition when the motor is not energized). This force induces one axial movement and one angular movement onto the shaft 36. In this particular case, the movement combination is shaft 36 rotating clockwise and moving axially towards gear 42 (see FIG. 2). This combination of movements is different from the remaining movement combinations. Normal motor operation includes two out of three remaining movement combinations. In this case, the shaft 36 rotates clockwise and moves axially away from the gear 42 (FIG. 5) or the shaft 36 moves counter-clockwise and moves axially towards gear 42 (FIG. 8).

The clutch assembly 10 is configured and oriented in such way that the assembly engages and locks when the above-mentioned external torque is applied, effectively preventing back drive of the system. Thus, as shown in FIGS. 2–4, the flange 33 of the pressure plate 14 comes into contact with each ball bearing 18, transferring the axial movement and angular movement to the ball bearings causing the ball bearings to ride up the respective cam surface 24 of a pocket 22 toward the shallow end 25, while increasing the distance between the flange 33 of the pressure plate 14 and the clutch body, until the retainer 20 comes into contact with the clutch body 12. At this time, the ball bearings 18 wedge against the planar surface 39 of the flange 33 of the pressure plate and the surfaces defining a respective pocket 22, thereby preventing further rotation of the pressure plate 14. The motor armature ceases to rotate eliminating back drive.

The orientation of the clutch assembly 10 is dependent on the helix orientation of the worm and the gear. The clutch assembly 10 supports the shaft 36 radially; therefore, a bearing is not required.

Figure 5:
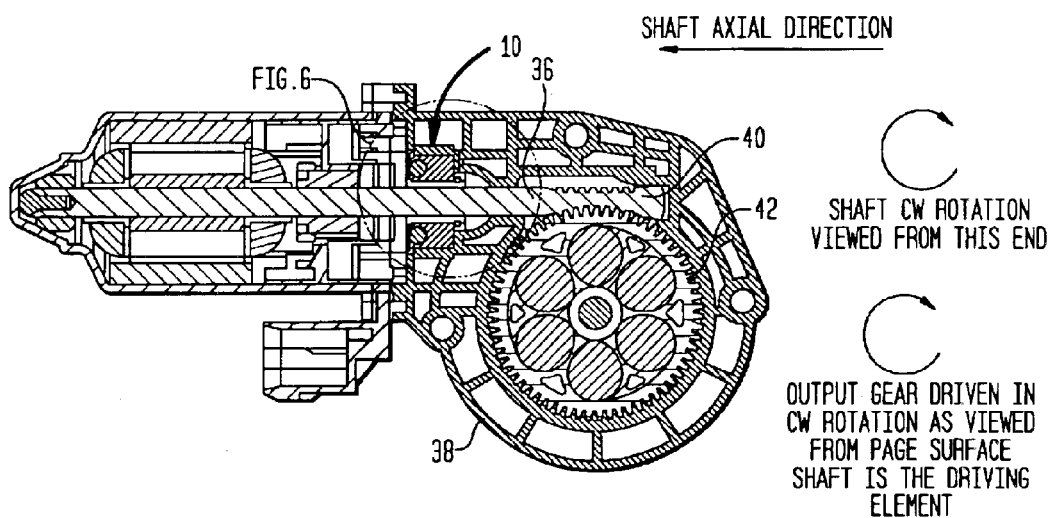
FIG. 5 is a sectional view of a motor having the clutch assembly of the invention with the motor shaft driving in a clockwise direction (motor energized).
Figure 6:
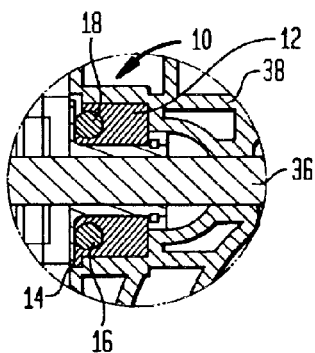
FIG. 6 is an enlarged sectional view of the portion encircled at 6 in FIG. 5.
Figure 7:
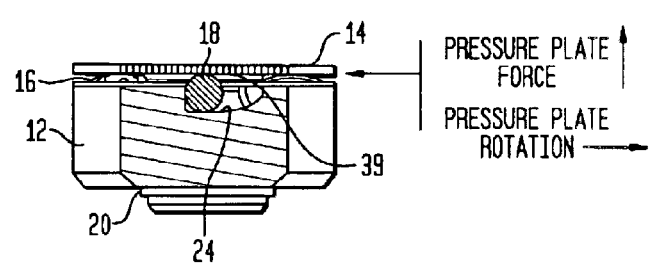
FIG. 7 is an enlarged view of the clutch assembly in the position shown in FIG. 5.

FIGS. 5–7 show the operation of the clutch assembly when the motor armature and thus shaft 36 are driving in the clockwise direction (e.g., the motor is energized). Each ball bearing 18 remains at the bottom (deep end 23) of the associated pocket 22 (due to pressure exerted by the spring plate, specifically the edges of the associated opening 26) so that the surface 39 of the flange 33 of the pressure plate 14 does not contact the ball bearings 18. This function of the clutch assembly 10 represents a normal operation for moving a window downwardly.

Figure 9:
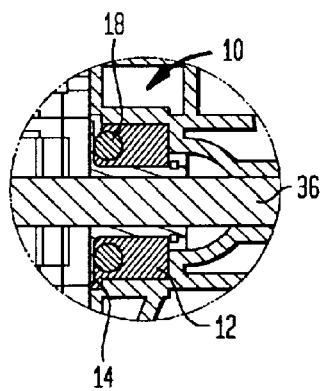
FIG. 9 is an enlarged view of the portion encircled at 9 in FIG. 8.
Figure 10:
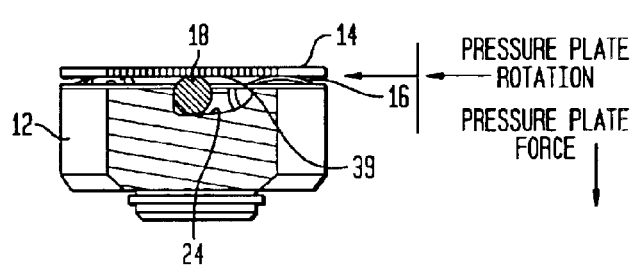
FIG. 10 is an enlarged sectional view of the clutch assembly in the position shown in FIG. 8.

FIGS. 8–10 show the operation of the clutch assembly when the motor armature and thus shaft 36 are driving in the counter-clockwise direction (e.g., the motor is energized). Each ball bearing 18 rides away from the shallow end 25 of the pocket 22 towards the deep end 23 and contacts the surface 39 of flange 33 and spins in position. This allows motor operation in the counter-clockwise direction without locking the motor armature. This function of the clutch assembly 10 represents a normal operation for moving a window upwardly.

In general, the clutch assembly 10 can be used in any application involving the use of worm gearing coupled to electric motors. The embodiment shows the clutch assembly 10 for use in an automotive windowlift application. The desired effect of the use of this clutch Is:

1) To prevent someone from pushing a door window down without any major impediment, and 2) Possible gains in efficiency, so that the electric motor can be configured with a smaller size to be used on the same original application.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A clutch assembly for a motor having a shaft, a worm associated with the shaft and an output gear engaged by the worm, the clutch assembly comprising:

a clutch body including a central bore there-through and a plurality of pockets in a surface thereof, each pocket having a cam surface defined by a depth of the pocket that gradually increases from a deep end to a shallow end, a ball bearing in each of said pockets, a spring plate constructed and arranged to maintain the ball bearings preloaded in an associated pocket, the spring plate having an opening therein associated with each ball bearing so that at least a portion of each ball bearing extends through an associated opening, and a pressure plate having a portion received in the bore of the clutch body and a flange defining a generally planar surface, the spring plate being disposed between the planar surface and the surface of the clutch body and providing a preload between the clutch body and the pressure plate, the pressure plate being constructed and arranged to be operably coupled with the shaft of the motor, the clutch assembly being constructed and arranged such that when the output gear of the motor is driven in a certain direction by an external torque causing an axial force to be exerted on the worm and thus inducing an axial movement and angular movement to the shaft, the flange of the pressure plate comes into contact with the ball bearings, transferring the axial and angular movement to the ball bearings, which in turn move up the cam surface towards the shallow end of each pocket until the ball bearings wedge between the planar surface of the flange and surfaces defining the associated pocket, thereby preventing rotation of the shaft when coupled with the pressure plate.

2. The clutch assembly of claim 1, wherein four ball bearings and four pockets are provided.

3. The clutch assembly of claim 1, wherein the spring plate has an opening there through and the portion of the pressure plate extends through the opening in the spring plate and the bore of the clutch body, an end of the portion of the pressure plate extends past an extent of the clutch body.

4. The clutch assembly of claim 3, wherein a retainer engages the end of the portion of the pressure plate to couple the pressure plate with respect to the clutch body.

5. The clutch assembly of claim 3, wherein the spring plate includes keyways around the opening and the clutch body includes keys around the bore that mate with the keyways for aligning the spring plate with respect to the clutch body.

6. The clutch assembly of claim 1, wherein the flange is cylindrical and the portion extends therefrom, the portion being cylindrical and having a diameter less than a diameter of the flange.

7. The clutch assembly of claim 1, wherein a bore extends through the flange and the portion of the pressure plate, the bore being constructed and arranged to receive the shaft in a press-fit arrangement.

8. The clutch assembly of claim 1, wherein the spring plate includes spring members providing the preload.

9. The clutch assembly of claim 1, in combination with the motor, the motor being constructed and arranged to rotate the shaft in two different directions.

10. A clutch assembly for a motor having a shaft, a worm associated with the shaft and an output gear engaged by the worm, the clutch assembly comprising:

a clutch body including a plurality of pockets in a surface thereof, each pocket having a cam surface defined by a depth of the pocket that gradually increases from a deep end to a shallow end, a ball bearing in each of said pockets, spring structure constructed and arranged to maintain the ball bearings in the pockets, and a pressure plate operatively associated with the clutch body and being constructed and arranged to be coupled with the shaft of the motor, the clutch assembly being constructed and arranged such that when the output gear of the motor is driven in a certain direction by an external torque causing an axial force to be exerted on the worm and thus inducing an axial movement and angular movement to the shaft, the pressure plate comes into contact with the ball bearings, transferring the axial and angular movement to the ball bearings, which in turn move up the cam surface towards the shallow end of each pocket until the ball bearings wedge between the pressure plate and surfaces defining the associated pocket, thereby preventing rotation of the shaft when coupled with the pressure plate, the clutch assembly being in combination with the motor, the motor being constructed and arranged to rotate the shaft in two different directions.

11. The clutch assembly of claim 10, wherein four ball bearings and four pockets are provided.

12. The clutch assembly of claim 10, wherein the spring structure is a spring plate having an opening there-through and the clutch assembly has a bore there-through, a portion of the pressure plate extends through the opening in the spring plate and the bore of the clutch body, an end of the portion of the pressure plate extends past an extent of the clutch body.

13. The clutch assembly of claim 12, wherein a retainer engages the end of the portion of the pressure plate to retain the pressure plate with respect to the clutch body.

14. The clutch assembly of claim 12, wherein the spring plate includes keyways around the opening and the clutch body includes keys around the bore that mate with the keyways for aligning the spring plate with respect to the clutch body.

15. The clutch assembly of claim 10, wherein the pressure plate includes cylindrical flange and a cylindrical portion extending therefrom, the cylindrical portion having a diameter less than a diameter of the flange.

16. The clutch assembly of claim 15, wherein a bore extends through the flange and the cylindrical portion, the bore being constructed and arranged to receive the shaft in a press-fit arrangement.

17. The clutch assembly of claim 10, wherein the spring structure includes spring members constructed and arranged to provide a preload between the pressure plate and the clutch body to decrease noise.

* * * * *